(12) United States Patent  (10) Patent No.: US 7,978,396 B2
Tsai  (45) Date of Patent: Jul. 12, 2011

(54) OPTICAL INTERFERENCE DISPLAY PANEL

(75) Inventor: Hsiung-Kuang Tsai, Taipei (TW)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/343,016

(22) Filed: Dec. 23, 2008

(65) Prior Publication Data

US 2009/0103167 A1    Apr. 23, 2009

Related U.S. Application Data

(62) Division of application No. 11/368,683, filed on Mar. 7, 2006, now Pat. No. 7,470,373, which is a division of application No. 10/807,147, filed on Mar. 24, 2004, now Pat. No. 7,307,776.

(30) Foreign Application Priority Data

Aug. 15, 2003   (TW) .............................. 92122566 A

(51) Int. Cl.
    *G02B 26/00* (2006.01)
(52) U.S. Cl. ................... 359/291; 359/290; 359/292
(58) Field of Classification Search .............. 359/290, 359/291, 292, 295, 298, 211.1–211.5, 212.1, 359/212.2, 213.1
See application file for complete search history.

(56) References Cited

U.S. PATENT DOCUMENTS

| | | | |
|---|---|---|---|
| 4,074,480 A | 2/1978 | Burton | |
| 4,310,220 A | 1/1982 | Kuwagaki et al. | |
| 4,383,255 A | 5/1983 | Grandjean et al. | |
| 4,459,182 A | 7/1984 | te Velde | |
| 4,956,619 A | 9/1990 | Hornbeck | |
| 5,018,256 A | 5/1991 | Hornbeck | |
| 5,099,353 A | 3/1992 | Hornbeck | |
| 5,216,537 A | 6/1993 | Hornbeck | |
| 5,244,707 A | 9/1993 | Shores | |
| 5,268,533 A | 12/1993 | Kovacs et al. | |
| 5,322,161 A | 6/1994 | Shichman et al. | |

(Continued)

FOREIGN PATENT DOCUMENTS

CN    1449990    10/2003

(Continued)

OTHER PUBLICATIONS

Greco et al., Optical properties of IPN-like networks polyethylene/poly(butylmethacrylate-co-styrene copolymer systems, III. Influence of copolymer crosslinkers, Polymer 42 (2001), 5089-5095.

(Continued)

*Primary Examiner* — Ricky L Mack
*Assistant Examiner* — Brandi N Thomas
(74) *Attorney, Agent, or Firm* — Knobbe Martens Olson & Bear LLP

(57) ABSTRACT

An optical interference display panel is disclosed that has a substrate, an optical interference reflection structure, and an opaque protection structure. The optical interference reflection structure has many color-changeable pixels and is formed on the substrate. The opaque protection structure is adhered and fixed onto the substrate with an adhesive and encloses the optical interference reflection structure between the substrate and the opaque protection structure. The opaque protection structure blocks and/or absorbs light, and light is thus not emitted outward by passing through defects in the optical interference reflection structure Moreover, the opaque protection structure and the adhesive also prevent the optical interference reflection structure from being damaged by an external environment.

19 Claims, 3 Drawing Sheets

U.S. PATENT DOCUMENTS

| | | | |
|---|---|---|---|
| 5,331,454 A | 7/1994 | Hornbeck | |
| 5,401,983 A | 3/1995 | Jokerst et al. | |
| 5,683,591 A | 11/1997 | Offenberg | |
| 5,717,476 A | 2/1998 | Kanezawa | |
| 5,771,321 A | 6/1998 | Stern | |
| 5,784,166 A * | 7/1998 | Sogard | 356/509 |
| 5,784,189 A | 7/1998 | Bozler et al. | |
| 5,835,255 A | 11/1998 | Miles | |
| 5,837,562 A | 11/1998 | Cho | |
| 5,853,662 A | 12/1998 | Watanabe | |
| 5,856,820 A | 1/1999 | Weigers et al. | |
| 5,936,758 A | 8/1999 | Fisher et al. | |
| 5,939,785 A | 8/1999 | Klonis et al. | |
| 5,959,763 A | 9/1999 | Bozler et al. | |
| 5,986,796 A | 11/1999 | Miles | |
| 5,999,306 A | 12/1999 | Atobe et al. | |
| 6,040,937 A | 3/2000 | Miles | |
| 6,055,090 A | 4/2000 | Miles | |
| 6,107,115 A | 8/2000 | Atobe et al. | |
| 6,120,339 A | 9/2000 | Alwan | |
| 6,127,765 A | 10/2000 | Fushinobu | |
| 6,195,196 B1 | 2/2001 | Kimura et al. | |
| 6,238,755 B1 | 5/2001 | Harvey et al. | |
| 6,303,986 B1 | 10/2001 | Shook | |
| 6,365,229 B1 | 4/2002 | Robbins | |
| 6,379,988 B1 | 4/2002 | Peterson et al. | |
| 6,426,124 B2 | 7/2002 | Olster et al. | |
| 6,426,461 B1 | 7/2002 | Ginter et al. | |
| 6,447,126 B1 | 9/2002 | Hornbeck | |
| 6,455,927 B1 | 9/2002 | Glenn et al. | |
| 6,462,392 B1 | 10/2002 | Pinter et al. | |
| 6,465,355 B1 | 10/2002 | Horsley | |
| 6,466,354 B1 | 10/2002 | Gudeman | |
| 6,472,739 B1 | 10/2002 | Wood et al. | |
| 6,489,670 B1 | 12/2002 | Peterson et al. | |
| 6,495,895 B1 | 12/2002 | Peterson et al. | |
| 6,507,385 B1 | 1/2003 | Nishiyama et al. | |
| 6,525,416 B2 | 2/2003 | Hauser et al. | |
| 6,538,312 B1 | 3/2003 | Peterson et al. | |
| 6,558,820 B2 | 5/2003 | Raychaudhuri et al. | |
| 6,583,921 B2 | 6/2003 | Nelson | |
| 6,589,625 B1 | 7/2003 | Kothari et al. | |
| 6,603,182 B1 | 8/2003 | Low et al. | |
| 6,650,455 B2 | 11/2003 | Miles | |
| 6,661,084 B1 | 12/2003 | Peterson et al. | |
| 6,674,159 B1 | 1/2004 | Peterson et al. | |
| 6,674,562 B1 | 1/2004 | Miles et al. | |
| 6,680,792 B2 | 1/2004 | Miles | |
| 6,690,444 B1 | 2/2004 | Wilkinson et al. | |
| 6,778,046 B2 | 8/2004 | Stafford et al. | |
| 6,779,260 B1 | 8/2004 | Brandenburg et al. | |
| 6,794,119 B2 | 9/2004 | Miles | |
| 6,833,668 B1 | 12/2004 | Yamada et al. | |
| 6,843,936 B1 | 1/2005 | Jacobs | |
| 6,867,896 B2 | 3/2005 | Miles | |
| 6,882,458 B2 | 4/2005 | Lin et al. | |
| 6,882,480 B2 | 4/2005 | Yanagisawa | |
| 6,914,245 B2 | 7/2005 | Sone et al. | |
| 6,940,631 B2 | 9/2005 | Ishikawa | |
| 6,977,391 B2 * | 12/2005 | Frischknecht | 257/40 |
| 6,995,890 B2 | 2/2006 | Lin | |
| 6,999,225 B2 | 2/2006 | Lin et al. | |
| 7,019,458 B2 | 3/2006 | Yoneda | |
| 7,042,643 B2 | 5/2006 | Miles | |
| 7,046,374 B1 | 5/2006 | Barbarossa | |
| 7,123,216 B1 | 10/2006 | Miles | |
| 7,153,016 B2 | 12/2006 | Chen | |
| 7,307,776 B2 | 12/2007 | Tsai et al. | |
| 7,393,712 B2 | 7/2008 | Smith et al. | |
| 7,456,497 B2 | 11/2008 | Higashi | |
| 7,470,373 B2 | 12/2008 | Tsai | |
| 7,532,385 B2 | 5/2009 | Lin | |
| 7,746,537 B2 | 6/2010 | Natarajan et al. | |
| 2001/0004085 A1 | 6/2001 | Gueissaz | |
| 2001/0055146 A1 | 12/2001 | Atobe et al. | |
| 2002/0012364 A1 | 1/2002 | Kalian et al. | |
| 2002/0043706 A1 | 4/2002 | Jerominek et al. | |
| 2002/0052392 A1 | 5/2002 | Day et al. | |
| 2002/0054424 A1 | 5/2002 | Miles | |
| 2002/0056898 A1 | 5/2002 | Lopes et al. | |
| 2002/0056900 A1 | 5/2002 | Liu et al. | |
| 2002/0057565 A1 | 5/2002 | Seo | |
| 2002/0075551 A1 | 6/2002 | Daneman | |
| 2002/0075555 A1 | 6/2002 | Miles | |
| 2002/0160583 A1 | 10/2002 | Song | |
| 2002/0187254 A1 | 12/2002 | Ghosh | |
| 2003/0043157 A1 | 3/2003 | Miles | |
| 2003/0054588 A1 | 3/2003 | Patel et al. | |
| 2003/0062186 A1 | 4/2003 | Boroson et al. | |
| 2003/0072070 A1 | 4/2003 | Miles | |
| 2003/0075794 A1 | 4/2003 | Felton et al. | |
| 2003/0108306 A1 | 6/2003 | Whitney et al. | |
| 2003/0144034 A1 | 7/2003 | Hack et al. | |
| 2003/0152787 A1* | 8/2003 | Arakawa et al. | 428/457 |
| 2003/0152872 A1 | 8/2003 | Miles | |
| 2003/0161126 A1 | 8/2003 | Wilkinson et al. | |
| 2003/0184412 A1 | 10/2003 | Gorrell | |
| 2004/0051929 A1 | 3/2004 | Sampsell et al. | |
| 2004/0061492 A1 | 4/2004 | Lopes et al. | |
| 2004/0076008 A1 | 4/2004 | Ikeda | |
| 2004/0100677 A1 | 5/2004 | Huibers et al. | |
| 2004/0126953 A1 | 7/2004 | Cheung | |
| 2004/0140557 A1 | 7/2004 | Sun et al. | |
| 2004/0166606 A1 | 8/2004 | Forehand | |
| 2004/0173886 A1 | 9/2004 | Carley | |
| 2004/0184133 A1 | 9/2004 | Su et al. | |
| 2004/0218251 A1 | 11/2004 | Piehl et al. | |
| 2005/0195462 A1 | 9/2005 | Lin | |
| 2005/0254982 A1 | 11/2005 | Cadeddu | |
| 2005/0275079 A1 | 12/2005 | Stark | |
| 2006/0274400 A1 | 12/2006 | Miles | |
| 2010/0144230 A1 | 6/2010 | Tyger | |

FOREIGN PATENT DOCUMENTS

| | | |
|---|---|---|
| EP | 0 695 959 | 2/1996 |
| EP | 0 822 570 | 2/1998 |
| EP | 1 418 154 | 5/2004 |
| EP | 1 433 742 | 6/2004 |
| FR | 2841380 | 12/2003 |
| JP | 61-206244 | 9/1986 |
| JP | 63-162378 | 10/1988 |
| JP | 10-70287 | 3/1998 |
| JP | 08-162006 | 6/1998 |
| JP | 11 337953 | 12/1999 |
| JP | 2001-318324 | 11/2001 |
| JP | 2001-351998 | 12/2001 |
| JP | 2002-062491 | 2/2002 |
| JP | 2002-062492 | 2/2002 |
| JP | 2002-258310 | 9/2002 |
| JP | 2002-296519 | 10/2002 |
| JP | 2002-312066 | 10/2002 |
| JP | 2002-328313 | 11/2002 |
| JP | 2002-357846 | 12/2002 |
| JP | 2003-075741 | 3/2003 |
| JP | 2003-233024 | 8/2003 |
| JP | 2003-330001 | 11/2003 |
| JP | 2004-053852 | 2/2004 |
| JP | 2004-078107 | 3/2004 |
| JP | 2004-118001 | 4/2004 |
| WO | WO 90/05795 | 5/1990 |
| WO | WO 95/01624 | 1/1995 |
| WO | WO 98/06118 | 2/1998 |
| WO | WO 00/16105 | 3/2000 |
| WO | WO 00/17695 | 3/2000 |
| WO | WO 01/45140 | 6/2001 |
| WO | WO 01/58804 | 8/2001 |
| WO | WO 02/42716 | 5/2002 |
| WO | WO 03/023849 | 3/2003 |
| WO | WO 03/026369 | 3/2003 |
| WO | WO 03/054925 | 3/2003 |
| WO | WO 03/070625 | 8/2003 |
| WO | WO 03/084861 | 10/2003 |
| WO | WO 03/095706 | 11/2003 |
| WO | WO 03/105198 | 12/2003 |
| WO | WO 2004/077523 | 9/2004 |

OTHER PUBLICATIONS

Miles, MEMS-based interferometric modulator for display applications, Proceedings of the SPIE, Micromachined Devices and Components V, Sep. 1999, pp. 20-28.

Moraja, et al., Advanced Getter Solutions at Wafer Level to Assure High Reliability to the last Generations MEMS, IEEE Reliability Physics Symposium Proceedings, 2003, pp. 458-459.

Sparks, et al. Chip-Level Vacuum Packaging of Micromachines Using NanoGetters, IEEE Transactions on Advanced Packaging, vol. 26 Issue 3, Aug. 2003, pp. 277-282.

Stark et al., An integrated process for post-packaging release and vacuum sealing of electroplated nickel packages, Transducers, 12th International Conference on Solid-State Sensors, Actuators and Microsystems, 2003, pp. 1911-1914.

Office Action dated May 19, 2006 in U.S. Appl. No. 10/807,147.

Office Action dated Jan. 16, 2007 in U.S. Appl. No. 10/807,147.

Office Action dated Jun. 9, 2006 in Chinese App. No. 03157797.0.

Office Action dated Oct. 19, 2006 in Japanese App. No. 2004-102021.

Office Action dated May 15, 2007 in Japanese App. No. 2004-102021.

Office Action dated Oct. 31, 2005 in Korean App. No. 10-2004-0043214.

Tilmans et al., The indent reflow sealing (IRS) technique-A method for the fabrication of scaled cavities for mems devices, Journal of Microelectromechanical Systems, 9(2), Jun. 2000.

Office Action dated Jun. 28, 2007 in U.S. Appl. No. 11/368,683.

Office Action dated Dec. 31, 2007 in U.S. Appl. No. 11/368,683.

Liang, Zhi-Hao et al., "A Low Temperature Wafer-Level Hermetic MEMS Package Using UV Curable Adhesive", Electronic Components and Technology Conference, 2004 IEEE, pp. 1486-1491.

\* cited by examiner

OPTICAL INTERFERENCE DISPLAY PANEL

CROSS REFERENCE TO RELATED APPLICATIONS

This is a divisional of U.S. application Ser. No. 11/368,683 filed Mar. 7, 2006, which is a divisional of U.S. application Ser. No. 10/807,147 filed Mar. 24, 2004, which claims priority to Taiwanese Application TW 92122566 filed Aug. 15, 2003. Each of the above applications is incorporated by reference hereby in its entirety.

BACKGROUND OF THE INVENTION

1. Field the of Invention

The present invention relates to a display panel. More particularly, the present invention relates to an optical interference display panel.

2. Description of Related Technology

Due to being lightweight and small in size, a display panel is favorable in the market of portable displays and displays with space limitations. To date, in addition to liquid crystal display (LCD), organic light emitting diode (OLEO) and plasma display panel (PDP) modules, a module of the optical interference display has been investigated.

U.S. Pat. No. 5,835,255 discloses a modulator array, that is, a color-changeable pixel for visible light which can be used in a display panel. FIG. 1A illustrates a cross-sectional view of a prior art modulator. Every modulator 100 comprises two walls, 102 and 104. These two walls are supported by posts 106, thus forming a cavity 108. The distance between these two walls, the depth of cavity 108, is D. The wall 102 is a light-incident electrode which, according to an absorption factor, absorbs visible light partially. The wall 104 is a light-reflection electrode that is flexed when a voltage is applied to it.

When the incident light shines through the wall 102 and arrives at the cavity 108, only the visible light with wavelengths corresponding to the formula 1.1 is reflected back, that is, $$2D = N\lambda \quad (1.1)$$

wherein N is a natural number.

When the depth of the cavity 108, D, equals one certain wavelength $\lambda_1$ of the incident light multiplied by any natural number, N, a constructive interference is produced, and a light with the wavelength $\lambda_1$ is reflected back. Thus, an observer viewing the panel from the direction of the incident light will observe light with the certain wavelength $\lambda_1$ reflected back at him. The modulator 100 here is in an "open" state.

FIG. 1B illustrates a cross-sectional view of the modulator 100 in FIG. 1A after a voltage is applied to it. Under the applied voltage, the wall 104 is flexed by electrostatic attraction toward the wall 102. At this moment, the distance between the walls 102 and 104, the depth of cavity 108, becomes d and may equal zero.

The D in the formula 1.1 is hence replaced with d, and only the visible light with another certain wavelength $\lambda_2$ satisfying the formula 1.1 produces a constructive interference and reflects back through the wall 102. However, in the modulator 100, the wall 102 is designed to have a high absorption rate for the light with the wavelength $\lambda_2$. Thus, the incident visible light with the wavelength $\lambda_2$ is absorbed, and the light with other wavelengths has destructive interference. All light is thereby filtered, and the observer is unable to see any reflected visible light when the wall 104 is flexed. The modulator 100 is now in a "closed" state, i.e. a dark state.

As described above, under the applied voltage, the wall 104 is flexed by electrostatic attraction toward the wall 102, such that the modulator 100 is switched from the "open" state to the "closed" state. When the modulator 100 is switched from the "closed" state to the "open" state, the voltage for flexing the wall 104 is removed, and the wall 104 elastically returns to the original state, i.e. the "open" state or light state, as illustrated in FIG. 1A.

The light-reflection electrode (the wall 104) is a membrane, typically made of metal, and generally is manufactured with a "sacrificial layer" technique widely used in the production of micro electro mechanical systems (MEMS). The light-reflection electrode is very thin and is easily damaged by even a tiny external force or by errors occurring during manufacturing, inhibiting it from functioning properly.

For example, the light-reflection electrode may receive defects by being touched during manufacturing or transporting procedures. A color-changeable pixel containing defects is unable to reflect the incident light at defect locations. Moreover, an observer is able to look through the defects at things behind the optical interference display panel, such as circuit boards or even light from another light source.

When the color-changeable pixel containing defects is operated in the dark state, the light from another light source behind it may pass through the defects and be emitted outward so as to make the color-changeable pixel act in an undesired "light" state. Furthermore, after passing through the defects, the original incident light is reflected by the things behind the color-changeable pixel, such as metal lines on the circuit board. The reflected light is directly emitted outward without being filtered by the color-changeable pixel, thus causing another undesired appearance of a "light" state. These undesired "light" states of the color-changeable pixel resemble bad pixels on the optical interference display panel.

Display panel contrast is typically defined as a ratio of the brightness of the "light" state to the "dark" state. The optical interference display panel totally comprises a plurality of color-changeable pixels. Therefore, the color-changeable pixels having defects which cause bad pixels lower the contrast and the display performance of the display panel.

SUMMARY OF CLEAR INVENTIVE ASPECTS

It is therefore an objective of the present invention to provide an optical interference display panel which mitigates the bad pixels caused by the defects in the optical interference reflection structure.

It is another objective of the present invention to provide an optical interference display panel which enhances the contrast of the optical interference display panel.

It is still another objective of the present invention to provide an optical interference display panel that protects an optical interference reflection structure therein from being damaged by an external environment.

It is still another objective of the present invention to provide an optical interference display panel that enhances the display performance thereof, increases its reliability, and prolongs its lifetime.

In accordance with the foregoing and other objectives of the present invention, an optical interference display panel is provided. The optical interference display panel has a substrate, an optical interference reflection structure, and an opaque protection structure. The optical interference reflection structure has many color-changeable pixels and is formed on the substrate. The opaque protection structure is adhered and fixed onto the substrate with an adhesive and thus encloses the optical interference reflection structure between the substrate and the opaque protection structure. The opaque protection structure blocks and/or absorbs light, and light is thereby not emitted outward by passing through defects in the optical interference reflection structure. Moreover, the opaque protection structure and the adhesive also prevent the optical interference reflection structure from being damaged by an external environment.

According to one preferred embodiment of the invention, the opaque protection structure is made of an opaque material or a light absorptive material, such as a metal material or an opaque polymer. The opaque polymer can be a dyed polymer, e.g. a plastic mixed with a black dye.

The optical interference reflection structure comprises a plurality of color-changeable pixels. The substrate and the opaque protection structure are airtight to prevent the optical interference reflection structure from being damaged by an external environment. The opaque protection structure is a flat structure. The adhesive comprises a material such as a UV glue or a thermosetting adhesive. Moreover, the adhesive further comprises spacers. According to another preferred embodiment of the invention, the opaque protection structure can be a U-shaped structure.

According to another preferred embodiment of the invention, the opaque protection structure is a combination of a substrate and an opaque film. The opaque film is deposited either on the side of the substrate which is near the color-changeable pixel or on the other side. The opaque film is a metal film or a light absorptive film. The light absorptive film is a polymer film or a dyed film, coated on the substrate. Furthermore, the light absorptive film can also be a multilayer film, comprised of metals, metal oxides and/or other materials, to block and absorb the light.

To manufacture the invention, a first electrode and a sacrificial layer are formed in order on the substrate, and then a plurality of openings are formed in the first electrode and the sacrificial layer. One support is formed in each of the openings, and a second electrode is then formed on the sacrificial layer and the supports. Afterward, the sacrificial layer is removed by a release etch process to form a cavity.

Next, an opaque protection structure is adhered to the substrate such that the optical interference reflection structure is positioned between the opaque protection structure and the substrate. A pressing procedure is used to make the adhesion between the opaque protection structure and the substrate closer and tighter. In addition, if the adhesive is the thermosetting adhesive, a heating procedure can be used to heat the thermosetting adhesive to solidify and fix it.

The optical interference display panel provides an opaque protection structure to adhere to the substrate for enclosing the optical interference reflection structure, thus preventing light from passing through defects in the optical interference reflection structure and being emitted outward to cause spot defects. Therefore, the invention mitigates bad pixels in the optical interference display panel and enhances the contrast thereof.

The opaque protection structure also prevents the optical interference reflection structure from being damaged by an external force. Moreover, the adhesive hermetically seals the optical interference reflection structure within the display panel, effectively preventing an external environment such as water, dust or oxygen in the air, from being in contact with the optical interference reflection structure and consequently generating electrostatic force in the structure or oxidizing it to adversely affect its optical or electrical properties. In conclusion, the invention improves the display performance of the optical interference display panel, decreases the quantity of defective pixels, and prolongs the lifetime thereof.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DETAILED DESCRIPTION OF CERTAIN EMBODIMENTS

Figure 1A:
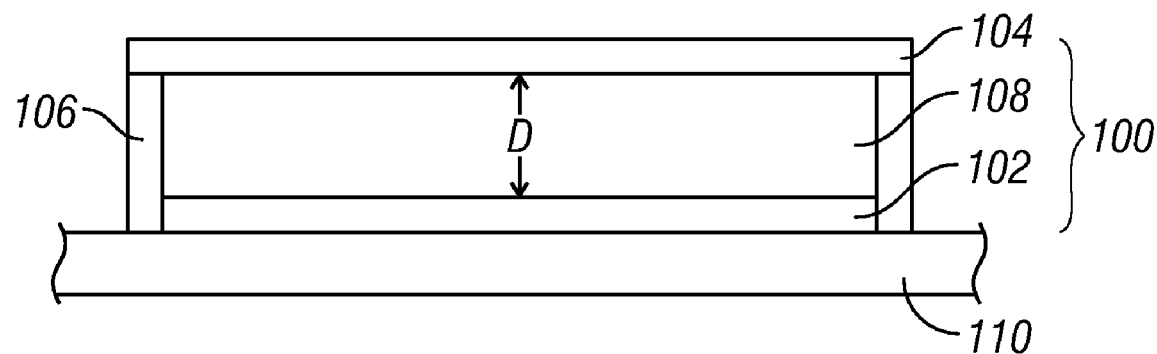
FIG. 1A illustrates a cross-sectional view of a prior art modulator.
Figure 1B:
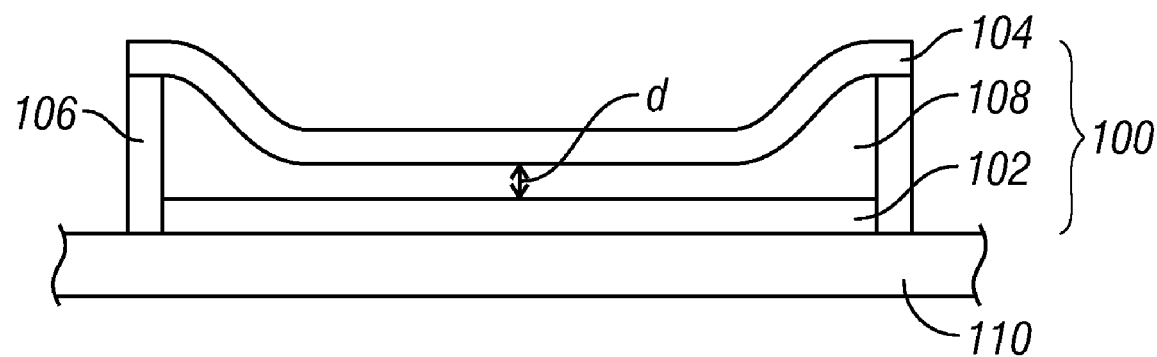
FIG. 1B illustrates a cross-sectional view of the modulator in FIG. 1A after a voltage is applied to it.

Reference will now be made in detail to the present preferred embodiments of the invention, examples of which are illustrated in the accompanying drawings. Wherever possible, the same reference numbers are used in the drawings and the description to refer to the same or like parts.

The optical interference display panel has a substrate, an optical interference reflection structure, and an opaque protection structure. The optical interference reflection structure has many color-changeable pixels and is formed on the substrate. The opaque protection structure is adhered and fixed onto the substrate with an adhesive, thus enclosing the optical interference reflection structure between the substrate and the opaque protection structure. The opaque protection structure blocks and/or absorbs light, and light thus is not emitted outward by passing through defects in the optical interference reflection structure. Moreover, the opaque protection structure and the adhesive also prevent the optical interference reflection structure from being damaged by an external environment.

Figure 2A:
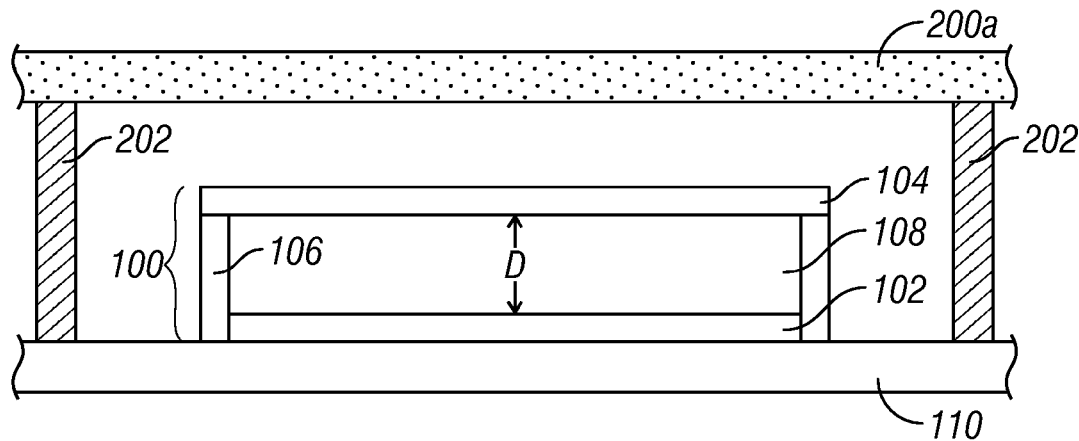
FIG. 2A illustrates a cross-sectional view of one preferred embodiment of the invention.

FIG. 2A illustrates a cross-sectional view of one preferred embodiment of the invention. The optical interference reflection structure has a plurality of color-changeable pixels. For clarity and ease of understanding, the following descriptions and figures use only one color-changeable pixel 100 to represent the optical interference reflection structure inside the optical interference display panel of this preferred embodiment.

As illustrated in FIG. 2A, a flat protection structure 200a is adhered to a substrate 110 with an adhesive 202. The substrate 110 is a glass substrate or a substrate transparent to visible light. The flat protection structure 200a reduces the possibility that an external force reaches the color-changeable pixel 100. Moreover, the adhesive 202 seals the optical interference reflection structure between the substrate 110 and the flat protection structure 200a. The adhesive 202 is used to isolate the color-changeable pixel 100 from an external environment and prevent it from being damaged by water, dust and oxygen in the air.

When water in the air gets into the cavity 108 of the color-changeable pixel 100, the electrostatic force caused by the water is very large (because the depth D of the cavity is very small) and thus inhibits the color-changeable pixel 100 from being switched successfully. When the metal film, such as the light-incident electrode or the light-reflection electrode of the color-changeable pixel is in contact with oxygen, the metal film is very easily oxidized, and the optical and electrical properties of the color-changeable pixel 100 are adversely affected.

In the preferred embodiment, the adhesive 202 is not only used to adhere the flat protection structure 200a to the substrate 110 but also to isolate the color-changeable pixel 100 from an external environment. The high isolation effectively protects the color-changeable pixel 100 from damage. According to one preferred embodiment of the invention, when the adhesive joins the flat protection structure 200a to the substrate 110 such that the color-changeable pixel is hermetically sealed, the reliability and the lifetime of the color-changeable pixel are substantially increased.

The flat protection structure 200a is made of an opaque material or a light absorptive material, such as a metal material or an opaque polymer. The opaque polymer can be a dyed polymer, e.g. a plastic mixed with a black dye. The adhesive 202 comprises a material such as a UV glue or a thermosetting adhesive. However, other adhesives suitable for adhering the opaque protection structure and the substrate are available to be used in the invention and are not limited by this embodiment.

In addition, during the adhering of the flat protection structure 200a to the substrate 110, a pressing procedure is usually used to position the flat protection structure 200a and the substrate 110 closer and tighter. In order to prevent the flat protection structure 200a from crushing the wall 104 of the color-changeable pixel 100, or to prevent the opaque protection structure from being shifted or tilted to the substrate 110 by an external force, the preferred embodiment adds spacers into the adhesive 202.

The adhesive 202 with spacers keeps a predetermined distance between the flat protection structure 200a and the substrate 110 and prevents the flat protection structure 200a from damaging the color-changeable pixel 100. In one example of the preferred embodiment, the size of the spacers is about 100 μm, and the size of the color-changeable pixel 100 is typically less than 1 μm. Therefore, there is a very large distance between the flat protection structure 200a and the wall 104, thus avoiding the foregoing possibility of being crushed.

Figure 2B:
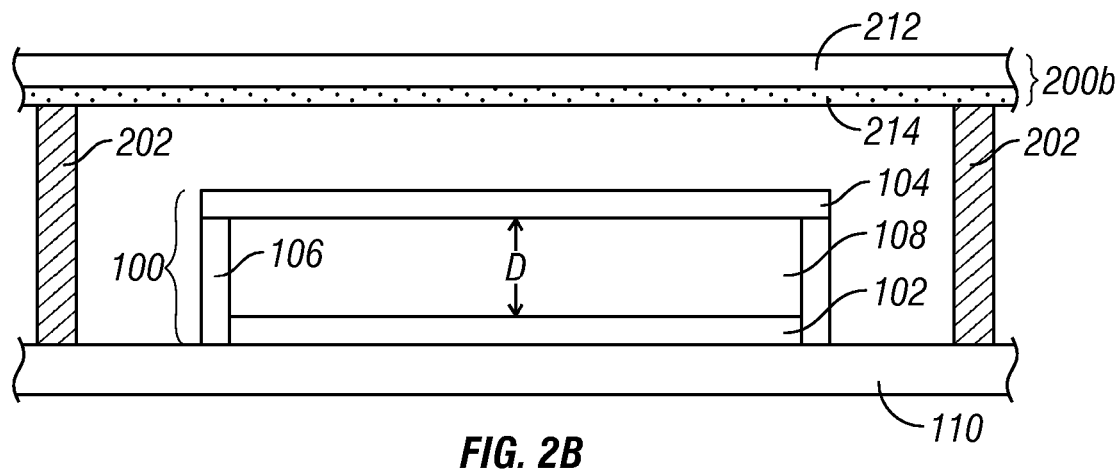
FIG. 2B illustrates a cross-sectional view of one preferred embodiment of the invention.

FIG. 2B illustrates a cross-sectional view of another preferred embodiment of the invention. The flat protection structure 200b is a combination of a substrate 212 and an opaque film 214. The opaque film 214 is deposited on either the side of the substrate 212 that is near the color-changeable pixel 100 or on the other side of the substrate 212.

According to one preferred embodiment of the invention, the opaque film 214 is located on the side of the substrate 212 near the color-changeable pixel 100. In this configuration, the opaque film 214 prevents external light from shining inward from the substrate 212 and passing through defects in the color-changeable pixel 100 to cause bad pixels. In addition, the opaque film 214 can directly absorb as well as prevent reflection of light that is passing through defects in the color-changeable pixel 100, thereby preventing the light from being reflected by the substrate 212 to cause bad pixels.

The opaque film is a metal film or a light absorptive film. The light absorptive film is a polymer film or a dyed film, coated on the substrate. The light absorptive film also can be a multi-layer film, which is made of metals, metal oxides, and/or other materials, to block and absorb the light.

Figure 2C:
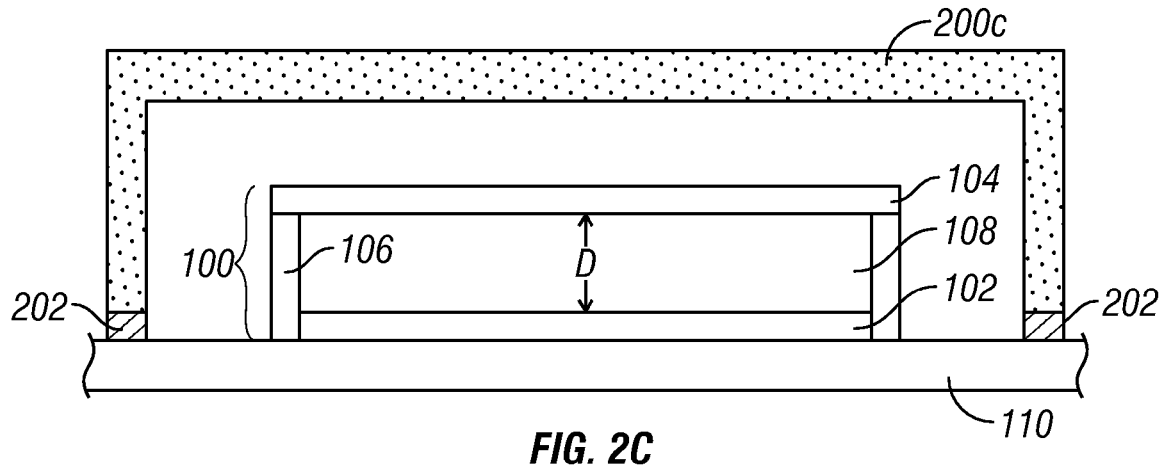
FIG. 2C illustrates a cross-sectional view of another preferred embodiment of the invention.

FIG. 2C illustrates a cross-sectional view of another preferred embodiment of the invention. In this preferred embodiment, the opaque protection structure is a U-shaped protection structure 200c. The U-shaped protection structure 200c is a flat structure having extended sides. As with the previous embodiment, the U-shaped protection structure 200c is adhered to the substrate 110 with the adhesive to isolate the color-changeable pixel 100 from water, dust and oxygen in the air and also to prevent the color-changeable pixel 100 from being damaged by an external force.

The material of the U-shaped protection structure 200c is an opaque material or a light absorptive material, or a combination of a substrate and an opaque film. The U-shaped protection structure 200c prevents external tight from passing through defects in the color-changeable pixel to cause bad pixels. In addition, the U-shaped protection structure 200c can directly absorb as well as prevent reflection of light originating from defects in the color-changeable pixel, thus preventing the light from being reflected by the protection structure 200c to cause bad pixels.

Figure 3A:
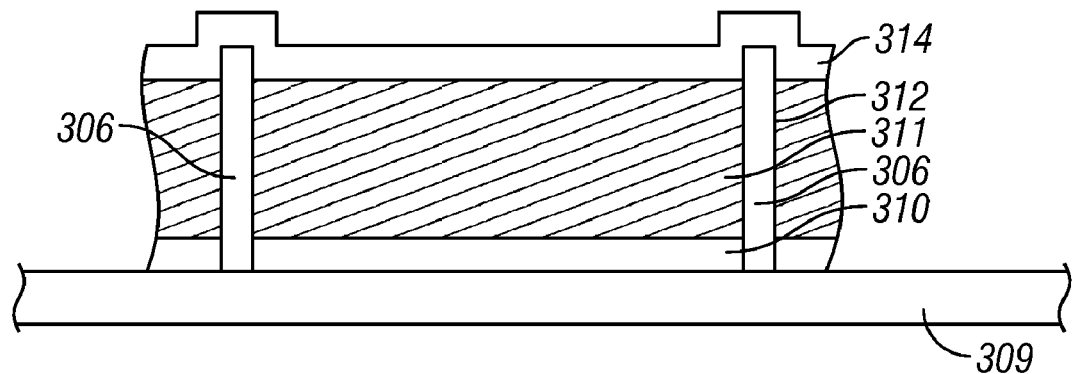
FIGS. 3A to 3B depict a method for manufacturing the preferred embodiment in FIG. 2A.
Figure 3B:
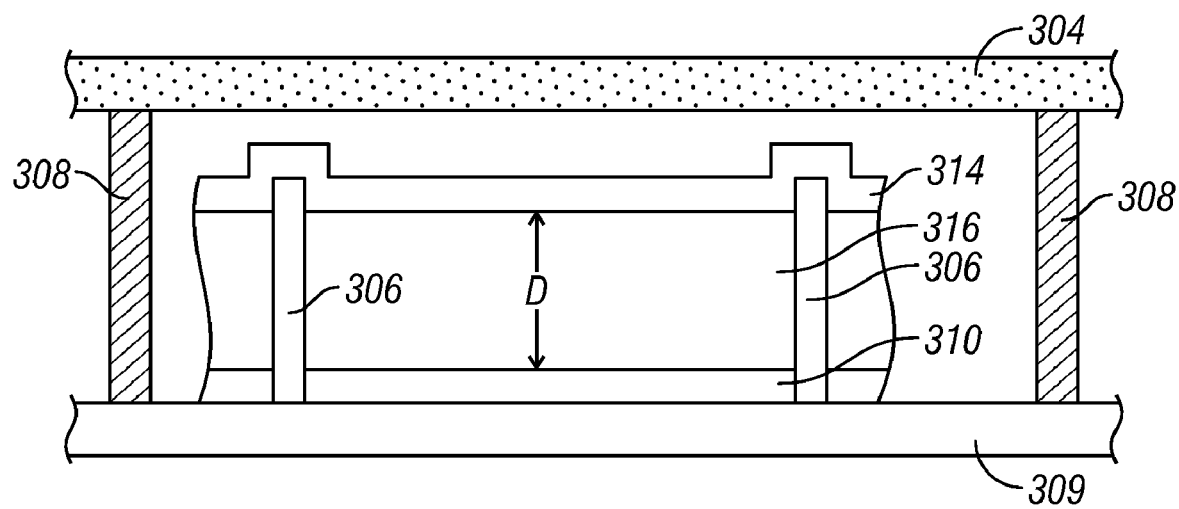

FIGS. 3A and 3B depict a method for manufacturing the embodiment in FIG. 2A. Reference is made to FIG. 3A first, in which a first electrode 310 and a sacrificial layer 311 are formed in order on a transparent substrate 309. Openings 312 are formed in the first electrode 310 and the sacrificial layer 311, and every opening 312 is suitable for forming one support 306 therein. Next, supports 306 are formed in the openings 312, and a second electrode 314 is formed on the sacrificial layer 311 and the supports 306.

Reference is made to FIG. 3B, in which the sacrificial layer 311 is removed by a release etch process, such as a remote plasma etch process, to form a cavity 316. The depth D of the cavity 316 is the thickness of the sacrificial layer 311. Afterward, an opaque flat protection structure 304 is adhered to the substrate 309 with an adhesive 308. During the adhering step, a pressing procedure is used to make the adhesion between the opaque flat protection structure 304 and the substrate 309 closer and tighter. In addition, if the adhesive 308 is a thermosetting adhesive, a heating procedure can be used to heat the thermosetting adhesive in order to solidify and fix it.

The foregoing description explains the method for manufacturing the optical interference display panel having the opaque flat protection structure. The manufacturing method for the optical interference display panel having the opaque U-shaped protection structure is similar and is described below for added clarity.

First, an optical interference reflection structure, which comprises the first electrode, the second electrode and the supports therebetween, is formed on the substrate. Then, an opaque U-shaped protection structure is adhered to the substrate such that the optical. interference reflection structure is positioned between the opaque U-shaped protection structure and the substrate. A pressing procedure is used to make the adhesion between the opaque U-shaped protection structure and the substrate closer and tighter.

The optical interference display panel provides an opaque protection structure that is adhered to the substrate and encloses the optical interference reflection structure, thus preventing light from passing through defects in the optical interference reflection structure and being emitted outward to cause bad pixels. Therefore, the invention decreases the appearance of bad pixels in the optical interference display panel and also enhances the contrast thereof.

The opaque protection structure also prevents the optical interference reflection structure from being damaged by an external force. Moreover, the adhesive seals the optical interference reflection structure within the display panel, effectively preventing an external environment, such as water, dust or oxygen in the air, from being in contact with the optical interference reflection structure and generating electrostatic force or oxidizing it to adversely affect its optical or electrical properties. In conclusion, the invention improves the display performance of the optical interference display panel, decreases the quantity of defective pixels, and prolongs the lifetime thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display, comprising:
    at least one interferometric modulator array on a first substrate; and
    an opaque protection structure attached to the first substrate to cover the at least one interferometric modulator array,
    wherein the opaque protection structure covers the at least one interferometric modulator array and prevents light from passing through a defect in the at least one interferometric modulator array.

2. The display of claim 1, wherein the interferometric modulator array comprises:
    a first electrode;
    a second electrode, wherein the second electrode is situated in parallel with the first electrode substantially; and
    a support, located between the first electrode and the second electrode to form a cavity, wherein the second electrode moves in response to a voltage applied between the first and second electrode.

3. The display of claim 1, wherein the opaque protection structure absorbs light.

4. The display of claim 1, wherein the opaque protection structure is a flat protection structure.

5. The display of claim 1, wherein the opaque protection structure is a U-shaped protection structure.

6. The display of claim 1, wherein the opaque protection structure comprises:
    a second substrate; and
    an opaque film, deposited on the second substrate.

7. The display of claim 6, wherein the opaque film is between the second substrate and the at least one interferometric modulator array.

8. The display of claim 6, wherein the opaque film is a metal film or a light absorptive film.

9. The display of claim 1, wherein the first substrate and the opaque protection structure are airtight to prevent the at least one interferometric modulator array from being damaged by an external environment.

10. The display of claim 1, wherein the opaque protection structure is adhered to the first substrate with an adhesive.

11. The display of claim 10, wherein the adhesive comprises spacers, and the spacers keep a predetermined distance between the opaque protection structure and the first substrate to prevent the opaque protection structure from damaging the at least one interferometric modulator array.

12. The display of claim 10, wherein the adhesive comprises a UV glue or a thermosetting adhesive.

13. The display of claim 1, wherein the at least one interferometric modulator array is located between the first substrate and the opaque protection structure.

14. A display, comprising:
    means for supporting a microelectromechanical system, wherein the microelectromechanical system comprises means for modulating light transmitted through said supporting means; and
    means for covering the modulating means to prevent light from passing through a defect in the modulating means, the covering means being attached to the supporting means and covering the modulating means.

15. The display of claim 14, wherein the modulating means comprises at least one interferometric modulator array.

16. The display of claim 14, wherein the supporting means comprises a transparent substrate.

17. The display of claim 14, wherein the covering means comprises an opaque protection structure.

18. The display of claim 14, wherein the covering means is adhered to the supporting means with an adhesive.

19. The display of claim 14, wherein the modulating means is located between the supporting means and the covering means.

* * * * *